United States Patent
Testoni

(10) Patent No.: US 9,941,556 B2
(45) Date of Patent: Apr. 10, 2018

(54) SUPPLY UNIT

(71) Applicant: Energica Motor Company S.p.A., Modena (IT)

(72) Inventor: Giampiero Testoni, Modena (IT)

(73) Assignee: Energica Motor Company S.p.A., Modena (IT)

( * ) Notice: Subject to any disclaimer, the term of this patent is extended or adjusted under 35 U.S.C. 154(b) by 233 days.

(21) Appl. No.: 15/027,698

(22) PCT Filed: Oct. 7, 2014

(86) PCT No.: PCT/IB2014/065114
§ 371 (c)(1),
(2) Date: Apr. 7, 2016

(87) PCT Pub. No.: WO2015/052647
PCT Pub. Date: Apr. 16, 2015

(65) Prior Publication Data
US 2016/0240900 A1    Aug. 18, 2016

(30) Foreign Application Priority Data

Oct. 7, 2013 (IT) .............................. MO2013A0281

(51) Int. Cl.
*H01M 10/65* (2014.01)
*H01M 10/6556* (2014.01)
(Continued)

(52) U.S. Cl.
CPC ......... *H01M 10/6556* (2015.04); *B62K 11/04* (2013.01); *H01M 2/1077* (2013.01);
(Continued)

(58) Field of Classification Search
CPC .................................................. H01M 10/65
See application file for complete search history.

(56) References Cited

U.S. PATENT DOCUMENTS

2002/0012833 A1    1/2002  Gow et al.
2013/0034764 A1    2/2013  Ochi et al.
2013/0330587 A1*  12/2013  Takahashi ........... H01M 2/1077
                                                                    429/99

FOREIGN PATENT DOCUMENTS

EP          2210803         7/2010
EP          2290728         3/2011
(Continued)

OTHER PUBLICATIONS

International Search Report and the Written Opinion dated Mar. 13, 2015 From the International Searching Authority Re. Application No. PCT/IB2014/065114 and Its Translation of Search Report in English.

*Primary Examiner* — Jacob Marks

(57) ABSTRACT

The supply unit (1) for an electric motorbike (2) comprises at least two electric batteries (6, 7, 8, 9) and at least a protection container (10, 11, 12) which contains the batteries (6, 7, 8, 9) and which comprises:
  a cooling plate (12) placed in contact with the batteries (6, 7, 8, 9) and having:
    a plurality of through holes (13) which communicate with the outside and which cross the cooling plate (12) in the direction of its width and/or its length, each of the holes (13) having an access on a first perimeter side (12a) of the cooling plate (12) and an exit on an opposite second perimeter side (12b) of the cooling plate (12); and
    two opposite transmission faces (17, 18) in contact with which are placed one or more batteries (6, 7, 8, 9), between the faces (17, 18) being obtained the through holes (13);
  two cooling half-shells (10, 11), each containing at least one of the batteries (6, 7, 8, 9) and placed in contact with the batteries (6, 7, 8, 9), the half-shells (10, 11)
(Continued)

being separated from the cooling plate (12) and joined thereto in correspondence of the transmission faces (17, 18).

11 Claims, 8 Drawing Sheets

(51) Int. Cl.
| | |
|---|---|
| *H01M 2/10* | (2006.01) |
| *H01M 10/625* | (2014.01) |
| *H01M 10/647* | (2014.01) |
| *H01M 10/6557* | (2014.01) |
| *H01M 10/613* | (2014.01) |
| *B62K 11/04* | (2006.01) |
| *B60K 1/04* | (2006.01) |
| *B60K 11/06* | (2006.01) |
| *B60K 1/00* | (2006.01) |

(52) U.S. Cl.
CPC ....... *H01M 2/1083* (2013.01); *H01M 10/613* (2015.04); *H01M 10/625* (2015.04); *H01M 10/647* (2015.04); *H01M 10/6557* (2015.04); *B60K 1/04* (2013.01); *B60K 11/06* (2013.01); *B60K 2001/005* (2013.01); *B60Y 2200/12* (2013.01); *B62K 2204/00* (2013.01); *B62K 2208/00* (2013.01); *H01M 2220/20* (2013.01)

(56) References Cited

FOREIGN PATENT DOCUMENTS

| | | |
|---|---|---|
| EP | 2388851 | 11/2011 |
| WO | WO 2010/148224 | 12/2010 |
| WO | WO 2013/077205 | 5/2013 |
| WO | WO 2015/052647 | 4/2015 |

\* cited by examiner

US 9,941,556 B2

SUPPLY UNIT

RELATED APPLICATIONS

This application is a National Phase of PCT Patent Application No. PCT/IB2014/065114 having International filing date of Oct. 7, 2014, which claims the benefit of priority of Italian Patent Application No. MO2013A000281 filed on Oct. 7, 2013. The contents of the above applications are all incorporated by reference as if fully set forth herein in their entirety.

FIELD

The present invention relates to a supply unit for electric motorbikes.

Electrically-driven motorbikes are known which are supplied by rechargeable batteries.

The known motorbikes include a trellis frame chassis defining, close to the steering head, a seat housing and supporting an electric power supply unit.

Such unit consists of a metal protection case and of a battery pack included in it.

The case, normally parallelepiped, contains the rechargeable batteries in their entirety, sealing them inside it.

A drawback of this known solution is tied to the fact that, during use, the batteries inside the case produce a large quantity of heat, only a small part of which is dissipated.

Consequently, the batteries contained in the case are liable to overheating and this, as is well known, considerably reduces their life cycle.

A particular type of monobloc battery is illustrated in patent document US 2002/012833.

This document shows a battery containment block comprising a first box-shaped container and a second box-shaped container, open at the top and having a number of internal partitions that split the containers into cells containing the batteries.

The first container and the second container are laterally coupled sealed and cooperate to define a flow duct for a cooling fluid.

In this respect, the first container has an access opening for the inflow of the cooling fluid, while the second container has an outflow opening; both the openings are obtained on a same side of the battery and are connected to a fluid supply pump.

The solution shown in US 2002/012833 is also not without its drawbacks including:
- the need to provide a cooling fluid supply pump is badly suited to catering to the requirements of lightness and compactness normally present on board a vehicle like an electric motorbike;
- the use of two containers to be coupled sealed is not very practical and requires very narrow work tolerances, with altogether very high manufacturing costs.

SUMMARY OF THE INVENTION

The main aim of the present invention is to provide a supply unit for electric motorbikes that prevents battery overheating.

A further object of the present invention is to provide a supply unit for electric motorbikes that does not require the use of supply pumps on board the vehicle and which is practical and easy to make and assemble.

Another object of the present invention is to provide a supply unit for electric motorbikes which allows to overcome the mentioned drawbacks of the prior art within the ambit of a simple, rational, easy and effective to use as well as affordable solution.

The above mentioned objects are achieved by the present supply unit for electric motorbikes, made in accordance to claim 1.

BRIEF DESCRIPTION OF THE SEVERAL VIEWS OF THE DRAWINGS

Other characteristics and advantages of the present invention will become better evident from the description of a preferred but not exclusive embodiment of a supply unit for electric motorbikes, illustrated by way of an indicative, but not limitative, example in the accompanying drawings in which.

DESCRIPTION OF SPECIFIC EMBODIMENTS OF THE INVENTION

With particular reference to such figures, globally indicated by 1 is a supply unit for an electric motorbike 2 according to the invention.

The unit 1 of the invention is therefore designed to supply the motor 5 of an electric motorbike 2.

Figure 1:
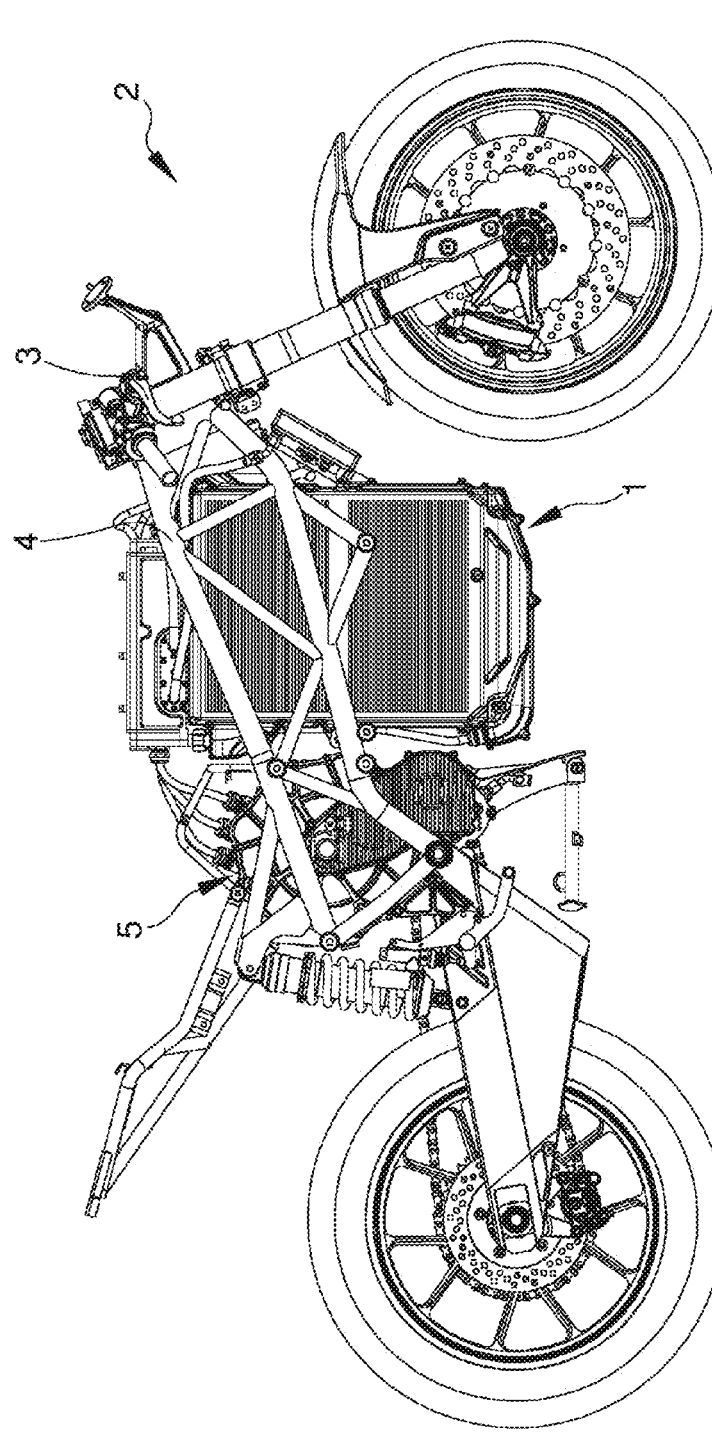
FIG. 1 is a side view of a motorcycle which mounts the supply unit according to the invention.
Figure 2:
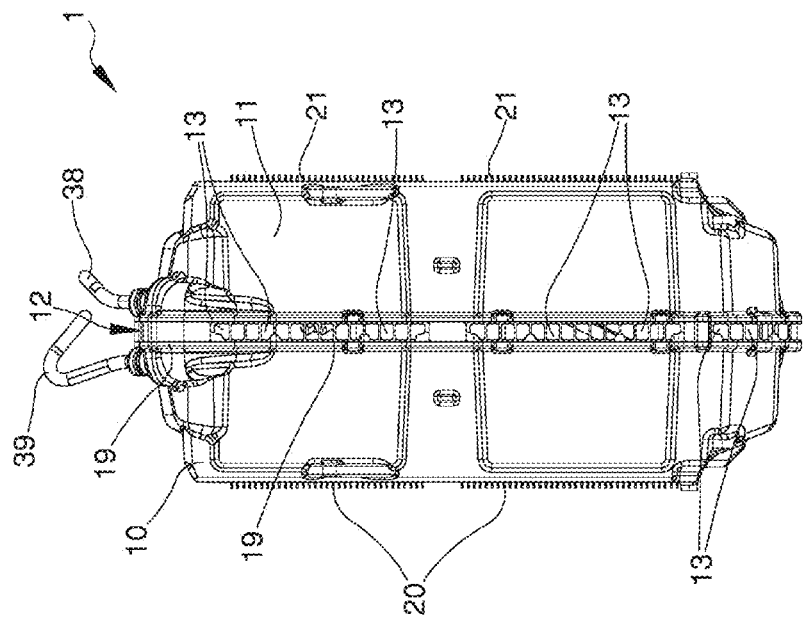
FIG. 2 is an axonometric view of the supply unit according to the invention.
Figure 3:
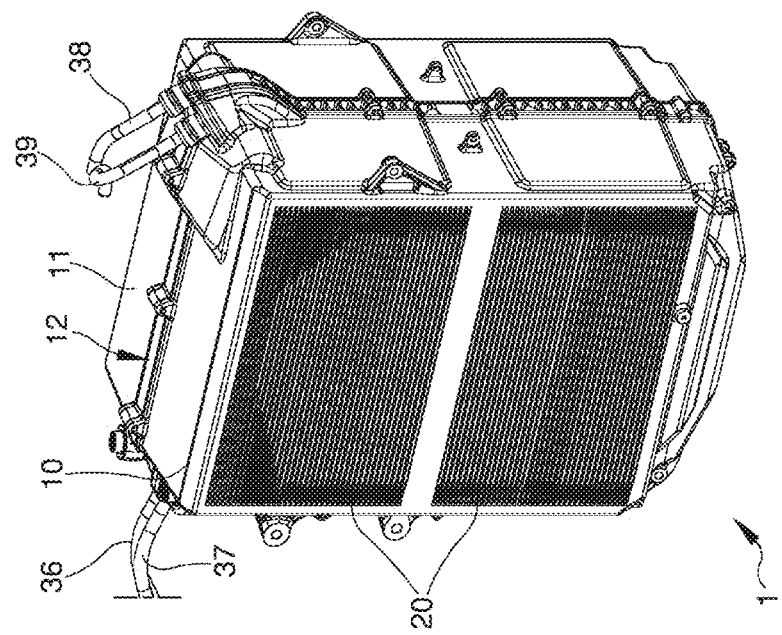
FIG. 3 is a front view of the supply unit according to the invention.
Figure 4:
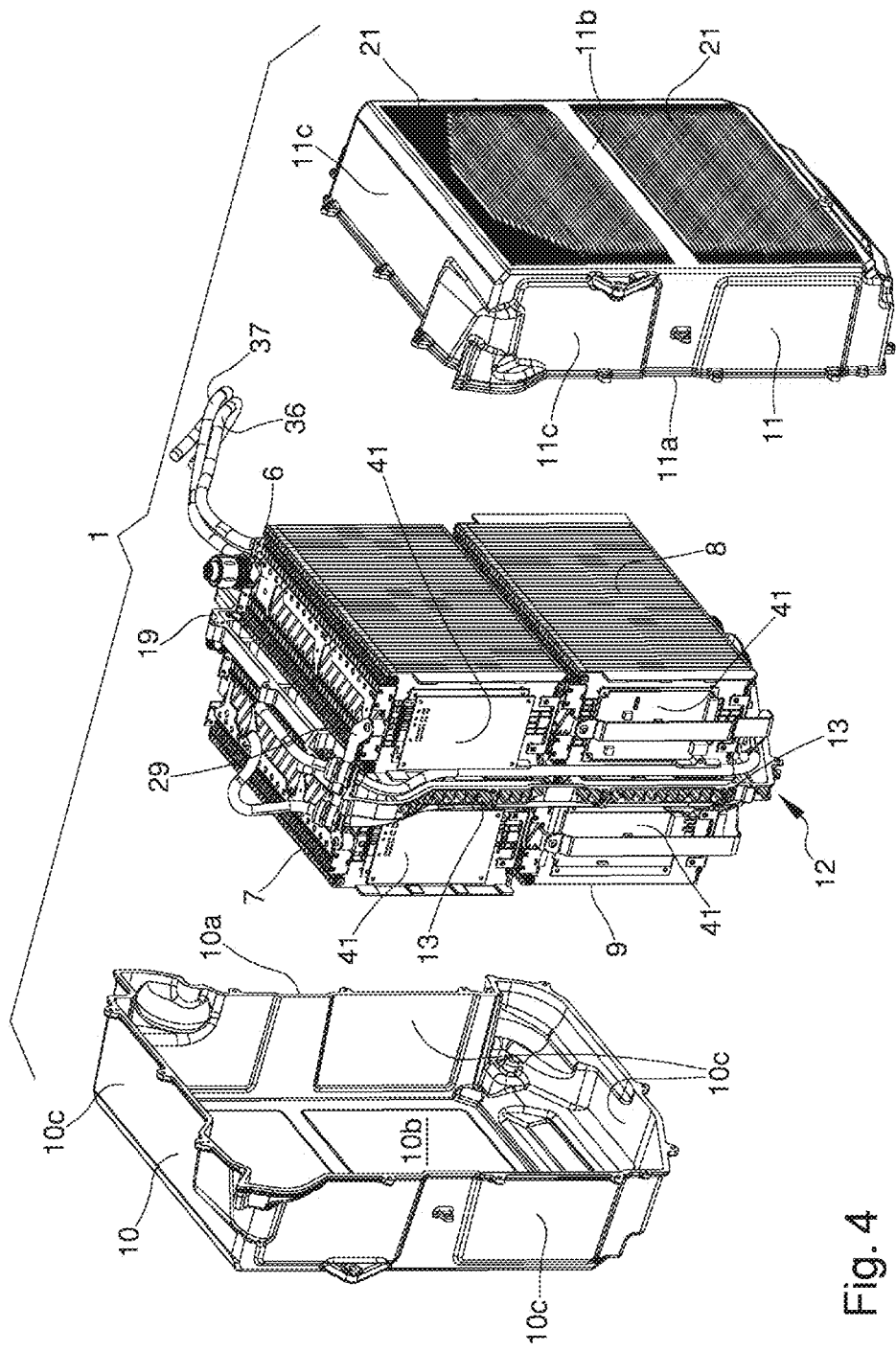
FIG. 4 is an exploded view of the supply unit according to the invention.

Preferably, as shown in the FIG. 1, the unit 1 is fitted on the chassis 4 of the motorbike 2 behind the steering head 3, in a position that corresponds to that which, in motorbikes with endothermic motors, is occupied by the fuel tank and by the endothermic motor itself.

In practice, the chassis 4 can have a special seat between the steering head 3 and saddle which accommodates the supply unit 1.

The chassis 4 can be configured like that described in the U.S. patent application Ser. No. 13/861,461, in the name of the Applicant.

The unit 1 comprises at least one electric battery 6, 7, 8, 9, but preferably four, as shown in the attached illustrations, and a container 10, 11, 12 for protecting the batteries 6, 7, 8, 9.

According to an important aspect of the invention, the container 10, 11, 12 comprises a cooling plate 12, made e.g. of aluminium, placed in contact with the batteries 6, 7, 8, 9 and having a plurality of through holes 13, which communicate with the outside and longitudinally cross the cooling plate 12.

In this respect, it is specified that, within the scope of this treatise, the fact that the holes 13 longitudinally cross the cooling plate 12 means they extend parallel to the plate itself, i.e., in the direction of its width and/or its length, not its thickness, as can be clearly seen in the illustrations.

In detail, the holes 13 have an access and an exit both communicating with the outside of the unit 1 and in them air circulates during the running of the motorbike 2 on which the unit 1 is fitted.

Figure 5:
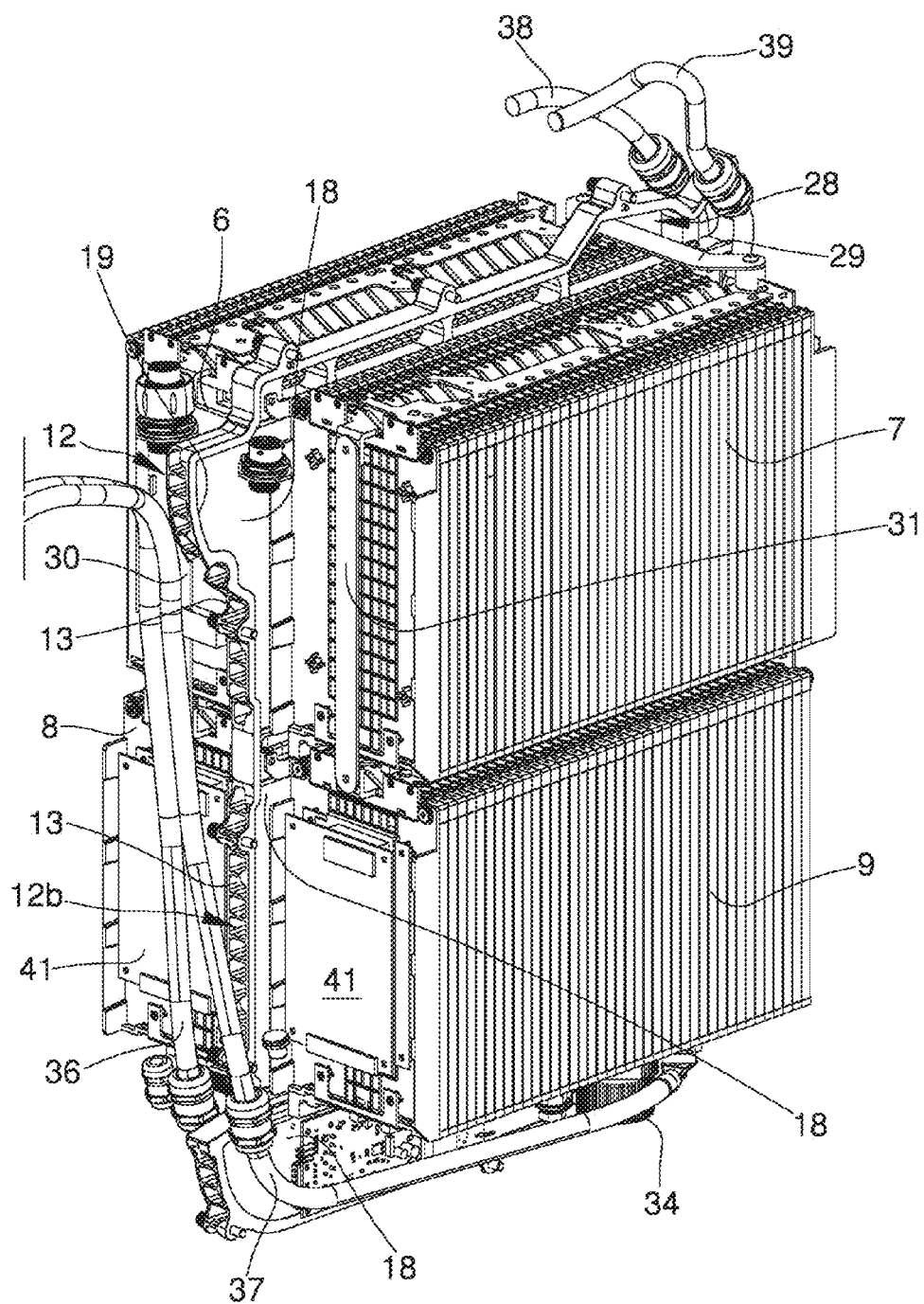
FIG. 5 is an axonometric view of the supply unit according to the invention, devoid of the protective container.
Figure 6:
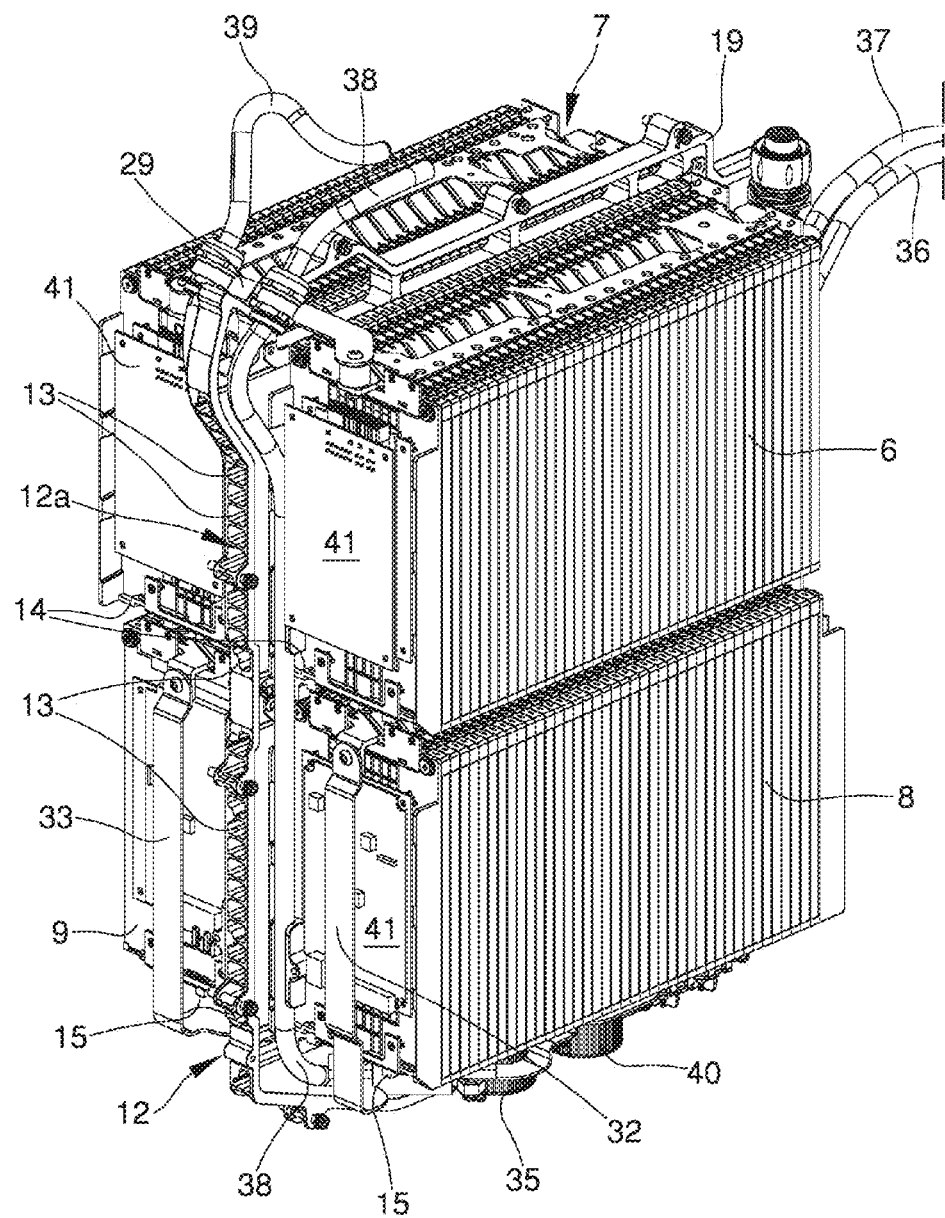
FIG. 6 shows the object of FIG. 5 from a different point of view.

More in detail, each of the holes 13 has an access on a first perimeter side 12*a* of the cooling plate 12 (in the forefront in FIG. 6) and an exit on a second perimeter side 12*b*, opposite the first perimeter side 12*a*, of the cooling plate 12 (in the forefront in FIG. 5).

The holes 13 are preferably rectilinear, parallel to each other and obtained full length in the cooling plate 12.

The holes 13 therefore open directly on the perimeter sides 12*a*, 12*b* without making any internal deviation or curve; this aspect is rather important to allow the correct cooling of the batteries 6, 7, 8, 9 which, as mentioned previously and as will be described in more detail below, occurs in a dynamic way during the running of the motorbike 2.

The holes 13 can have a prismatic section and be split up by a partition representing a common wall between adjacent holes 13.

During use, the cooling plate 12 is intended to be mounted on the electric motorbike 2 with the first perimeter side 12*a* and the second perimeter side 12*b* arranged substantially vertical and the holes 13 which, instead, extend substantially horizontal. In practice, the unit 1 of the invention has been provided to obtain the air cooling of the batteries 6, 7, 8, 9 included in it thanks to the thermal contact defined between the perforated cooling plate 12 and the batteries 6, 7, 8, 9 themselves, as well as thanks to the thermal contact of the batteries 6, 7, 8, 9 with two half-shells 10, 11 which will be described in greater detail below.

This way, heat is transmitted towards the outside by both the sides of the batteries 6, 7, 8, 9, with the cooling plate 12 and the half-shells 10, 11 respectively, which are shaped so as to dispose of the excess heat of the batteries 6, 7, 8, 9 together with the air.

Advantageously, the plate 12 also has the purpose of supporting the batteries 6, 7, 8, 9, preferably by means of specific brackets 14, 15.

In detail, the plate 12 has two lateral and opposite transmission faces 17, 18, in contact with which are placed the above-mentioned batteries 6, 7, 8, 9 and between which are obtained the above mentioned through holes 13 for the air to flow through.

The brackets 14, 15 protrude transversally from the faces 17, 18 and each of them supports a respective battery 6, 7, 8, 9.

In practice, the brackets 14, 15 support and are fixed to the respective battery 6, 7, 8, 9, the bottom of which rests on them.

Each battery 6, 7, 8, 9 supported by the brackets 14, 15 has an inner side in contact with the respective transmission face 17, 18, for the purpose of its cooling.

In practice, the holes 13 are oriented longitudinally in the plate 12 and are arranged on a plane which is parallel to the two transmission faces 17, 18.

The container 10, 11, 12 of the batteries 6, 7, 8, 9 preferably comprises two cooling half-shells 10, 11, with a substantially prismatic shape, each of which accommodating one or more batteries 6, 7, 8, 9.

The half-shells 10, 11 are separated from the plate 12, to define with this two inner volumes that house the batteries 6, 7, 8, 9 and also contain the respective brackets 14, 15.

The inner volumes are isolated from the outside, though they can be communicating. In detail, each volume preferably comprises a pair of superimposed batteries 6, 7, 8, 9.

The half-shells 10, 11 can be fixed in a removable way to the plate 12, e.g., by means of bolts or the like, in correspondence of respective transmission faces 17, 18 of the plate 12 itself.

In this respect, it is underlined that the half-shells 10, 11 have respective opening edges 10*a*, 11*a* and are associable with the cooling plate 12, with the opening edges 10*a*, 11*a* arranged substantially in correspondence of the perimeter of the transmission faces 17, 18.

The half-shells 10, 11 do in fact have a box shape with one open side, defined by a main wall 10*b*, 11*b*, which in the assembly configuration is arranged substantially parallel to the plate 12, and by a series of side walls 10*c*, 11*c*, which extend from the main wall 10*b*, 11*b* towards the plate 12.

The margins of the side walls 10*c*, 11*c* opposite the main wall 10*b*, 11*b* define the opening edges 10*a*, 11*a*.

The opening edges 10*a*, 11*a* are shaped substantially coinciding with the perimeter of the transmission faces 17, 18 and, in fact, once the unit 1 has been assembled, the opening edges 10*a*, 11*a* and the perimeter of the plate 12 coincide almost completely.

In correspondence of the line of contact between the plate 12 and the half-shells 10, 11 rubber seals 19 can be arranged.

The plate 12 is placed centrally in the supply unit 1, substantially in correspondence of a plane which divides the unit 1 into two halves.

Each inner volume preferably comprises two brackets 14, 15 and two respective batteries 6, 7, 8, 9 arranged superimposed, in a symmetric configuration with respect to the plane of the plate 12, to optimize the use of the available spaces.

In order to increase heat dissipation, the half-shells 10, 11 each have a finned external surface 20, 21, arranged on one of their external walls opposite the plate 12 (i.e., the main wall 10*a*, 11*a*), which wall faces internally onto the external faces of the batteries 6, 7, 8, 9, i.e., the faces opposite the aforementioned internal faces that contact the plate 12.

Such external wall of the half-shells 10, 11 can directly contact such external face of the batteries 6, 7, 8, 9, to make dissipation more efficient.

Even more in detail, the batteries 6, 7, 8, 9 are parallelepiped and have the bigger long sides in contact with the respective face of the plate 12 and the respective external wall of the half-shell 10, 11, while one of the smaller long sides is arranged on the relative bracket 14, 15.

It should be noted that several battery models are configured so as to dissipate heat above all through their bigger long sides, and this is synergic with their arrangement inside the unit 1 of the invention.

Advantageously, in correspondence of the bigger long sides of the batteries 6, 7, 8, 9, a thermal interface material layer can be applied, to ensure the utmost dissipation efficiency both through the plate 12 and through the walls of the half-shells 10, 11.

In this respect, it is underlined that, within the scope of the present treatise, to say that the plate 12 and the half-shells 10, 11 are placed in contact with the batteries 6, 7, 8, 9 must be understood without the thermal interface material layer; in other words, this means that the surfaces of the plate 12, of the half-shells 10, 11 and of the batteries 6, 7, 8, 9 must be understood as in reciprocal contact both in the presence of the thermal interface material layer and in its absence.

The thermal interface material layer, in fact, consists in a sheet of material having characteristics such as to improve contact and heat transmission and, therefore, the plate 12 and the half-shells 10, 11 must always be considered in contact with the batteries 6, 7, 8, 9 including in the presence of the thermal interface material layer.

The brackets 14, 15 have shape and dimensions comparable to the side of the battery 6, 7, 8, 9 resting on them.

In the preferred embodiment of the invention, the plate 12 includes one or more cooling parts 22, 23, 24, wherein are obtained the through holes 13, and one or more structural parts 25, 26, 27, having e.g. a greater mechanical resistance than the cooling parts 22, 23, 24.

In practice, the cooling parts 22, 23, 24 have a multiplicity of holes 13 for the air, to define a honeycomb structure having thin walls.

The structural parts 25, 26, 27 have thicker walls, which does not rule out that they can have openings 28, e.g., lightening openings.

Preferably, the cooling parts 22, 23, 24 and the structural parts 25, 26, 27 are arranged alternately in the plate 12 in the direction of its height.

For example, they can have three cooling parts 22, 23, 24 and three structural parts 25, 26, 27.

Usefully, the cooling parts 22, 23, 24 are obtained by extrusion and, after being suitably shaped, are fastened to the structural parts 25, 26, 27, e.g., by welding.

At any rate, for each battery 6, 7, 8, 9, at least one cooling part is provided and, in the preferred case of a unit 1 with four batteries 6, 7, 8, 9, the plate 12 can include two main cooling parts 22, 23, at the opposite faces of which a respective battery 6, 7, 8, 9 is arranged in contact and alongside.

With the structural parts 25, 26, 27 are associated the above brackets 14, 15 and, advantageously, the batteries 6, 7, 8, 9 can also be fastened in a removable way.

During use, the supply unit 1 is mounted on the motorbike 2 oriented with the plate 12 arranged vertically when the motorbike 2 is "standing up".

In practice, the plate 12 is coplanar with the central symmetry plane of the motorbike 2 and the half-shells 10, 11 are arranged on the left side and on the right side of the vehicle 2 respectively.

In this configuration, the holes 13 for the flow of air are parallel to the longitudinal axis of the motorbike 2, i.e., to the horizontal axis identifying the anteroposterior direction of normal forward movement of the vehicle, while any openings 28 of the structural parts 25, 26, 27 of the plate 12 are oriented crossways.

During the running of the motorbike 2 therefore, air penetrates into the holes 13 of the plate 12 and crosses the entire length of these.

The cooling air flow is therefore the dynamic one produced by the forward movement of the motorbike 2.

The batteries 6, 7, 8, 9 included in the supply unit 1, which during use are subject to normal heating, are cooled thanks to their contact with the plate 12 and also further dissipate heat through the finned surfaces 20, 21 of the half-shells 10, 11.

At the same time, the batteries 6, 7, 8, 9 are always and in any case protected from any knocks by the presence of the half-shells 10, 11.

When the unit 1 is fitted on the motorbike 2 or in any case is oriented in space in the way it is fitted on the motorbike 2, two upper batteries 6, 7 and two lower batteries 8, 9 can be identified, separated from the plate 12.

For easier exposition, further components of the invention are described below, considering the unit 1 with the orientation in which it is fitted on the motorbike 2.

The batteries 6, 7, 8, 9 are connected in series by suitable electric connection means 29, 30, 31, 32, 33 which join the respective poles and which can comprise five conductive segments 29, 30, 31, 32, 33.

Opposite poles of the upper batteries 6, 7 are connected by a first segment 29, arranged horizontally, which passes in one of the above-mentioned openings 28 of the upper structural part 25 of the plate 12.

The remaining poles of the upper batteries 6, 7 are connected to opposite poles of the lower batteries 8, 9 by two rear vertical segments 30, 31 arranged on the back of the batteries along the rear thickness sides of the upper batteries 6, 7.

The remaining poles of the lower batteries 8, 9 are connected to the power supply circuitry 34, 35, 40 by means of lower conductive segments 32, 33 which pass along the front thickness sides of such batteries 8, 9.

Advantageously, in the above-mentioned internal volumes defined between half-shells 10, 11 and plate 12, the power supply and charge circuitry 34, 35, 40 and the control electronics 41 of the cells of the batteries 6, 7, 8, 9 are fully contained.

The control electronics can be of the BMS (battery management system) type and comprise, e.g., ten electronic boards 41 arranged in correspondence of the thickness sides of the batteries 6, 7, 8, 9, to minimize the overall dimensions of said electronics.

With the present solution, the risks of electric shocks are completely avoided for users and the length is reduced of the electric connections connecting the components of the invention.

In detail, the power supply and charge circuitry 34, 35, 40 is included in two lower compartments defined by the plate 12, by the lower brackets 15 and by the two half-shells 10, 11.

Such circuitry 34, 35, 40 can be fastened directly to the lower brackets 15.

Figure 7:
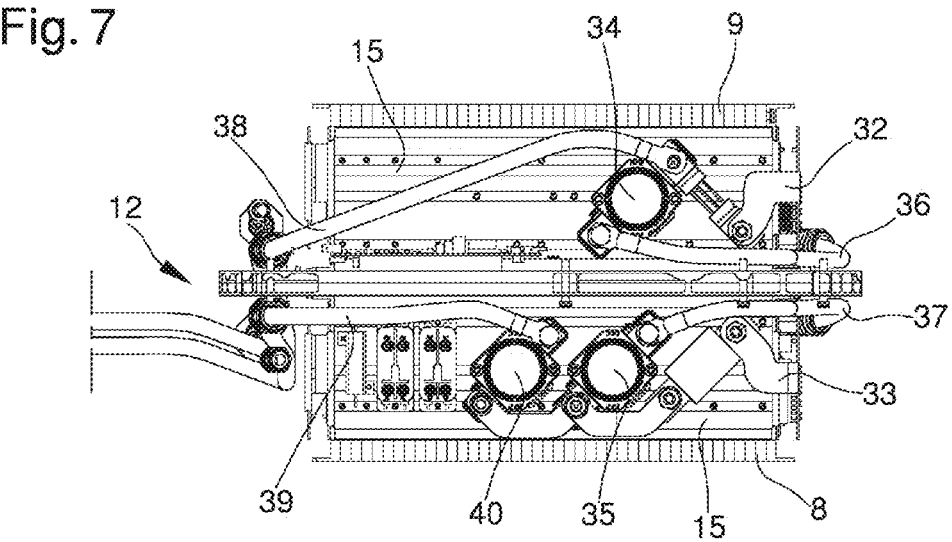
FIG. 7 is a view from below of the supply unit according to the invention, devoid of the protective container.
Figure 9:
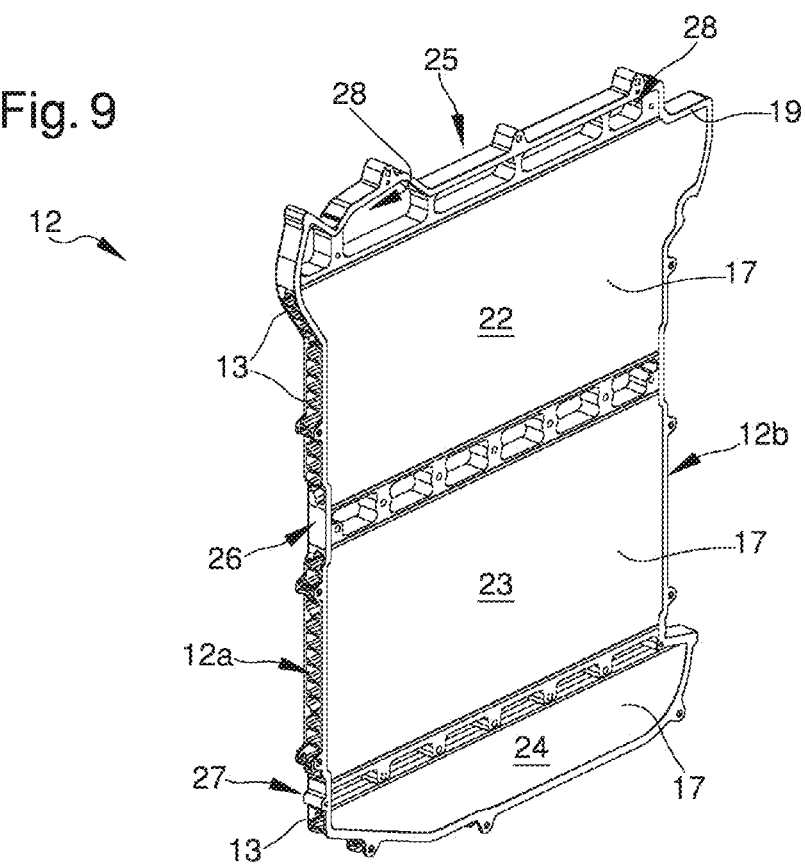
FIG. 9 is an axonometric view of a cooling plate of the supply unit according to the invention.
Figure 8:
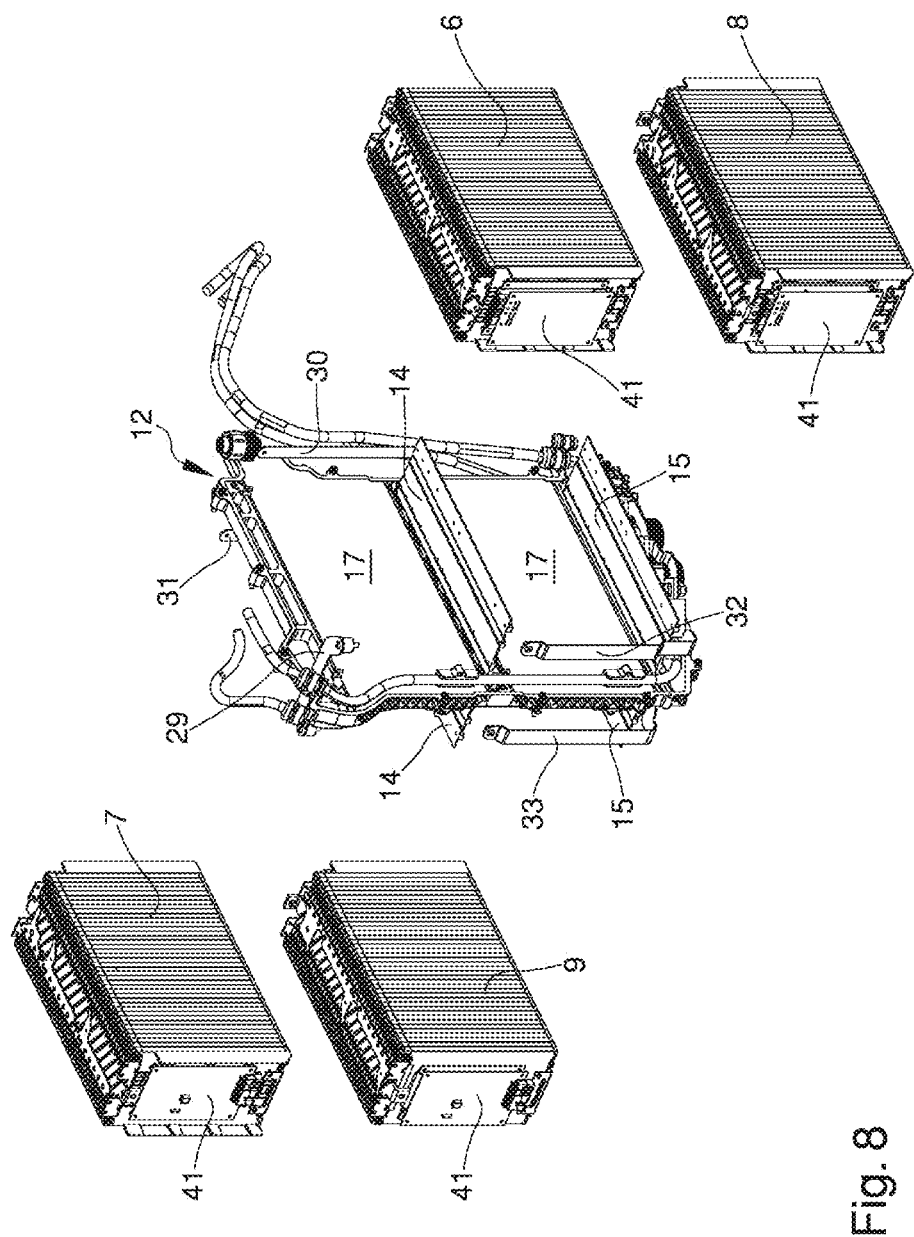
FIG. 8 is an exploded view showing the same object of FIGS. 5, 6 and 7.
Figure 10:
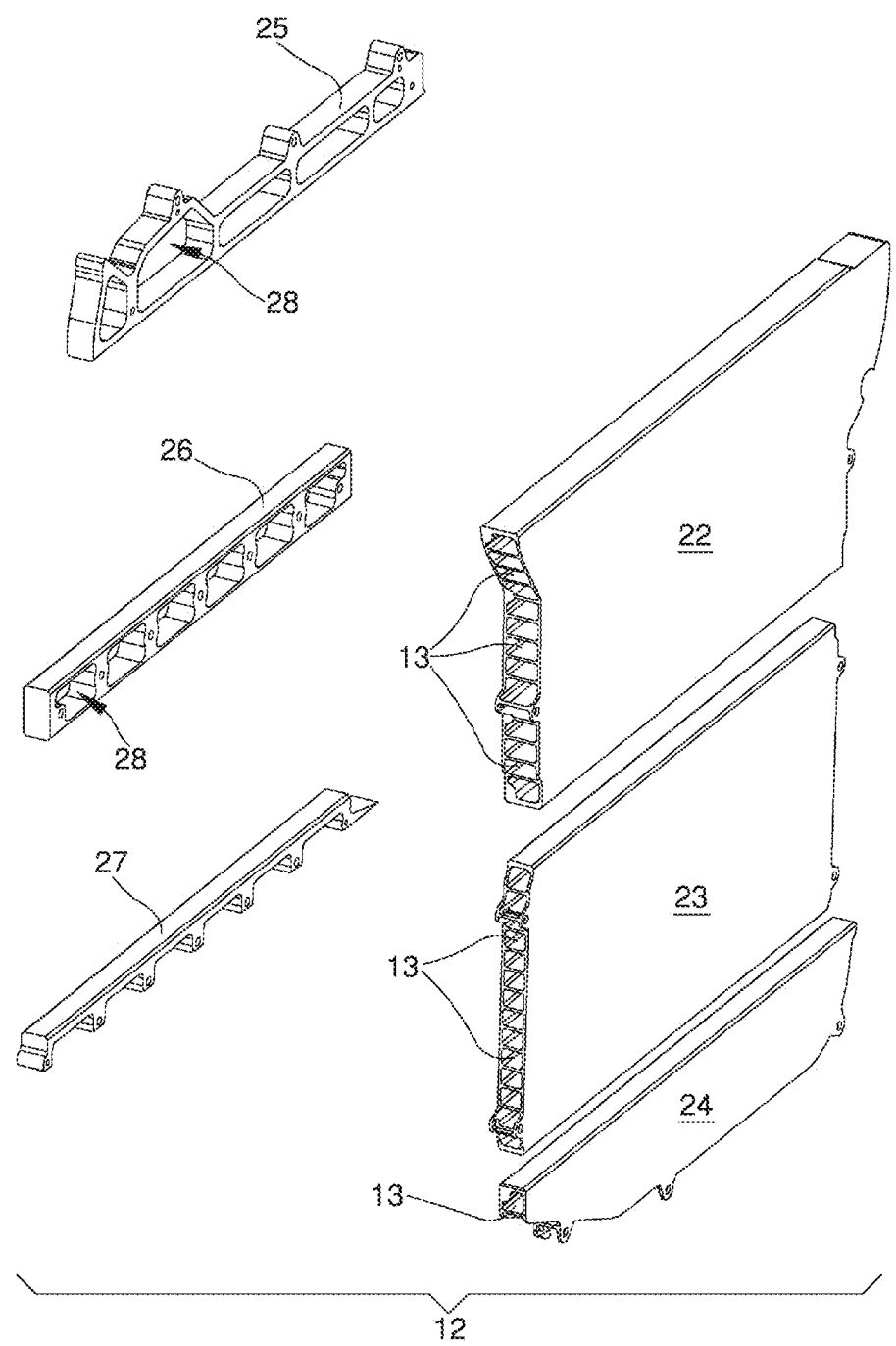
FIG. 10 is an exploded view of the cooling plate.

As shown in the FIG. 7, these compartments are reached by the above-mentioned lower conductive segments 32, 33 connected to the lower batteries 8, 9, which, with the interposition of respective first contactors 34, 35, are connected to the power supply cables 36, 37 which connect the unit 1 to the inverter which controls the motor 5 of the motorbike 2.

In correspondence of the contact between said lower segments 32, 33 and said contactors 34, 35, are also the connections between the lower segments 32, 33 and the charging cables 38, 39 of the batteries 6, 7, 8, 9, one of these connections being able to be equipped with a second contactor 40 to prevent the current passing at the same time through the charging cables 38, 39 and through the power supply cables 36, 37, in the different operating conditions of the unit 1.

It will be noticed that, for reasons of illustrative clarity, the attached tables show only the cables 38, 39 for the "rapid charge" of the batteries 6, 7, 8, 9, i.e., those used to connect up to rapid charge columns, such cables 38, 39 terminating in a socket that can be accommodated e.g. under the saddle of the motorbike 2.

Nevertheless, these cables 38, 39 are optional and the invention provides for main cables, not shown, to supply power by means of the home mains supply, with the interposition of a suitable battery charger.

What is claimed is:

1. Supply unit (1) for an electric motorbike (2) comprising at least two electric batteries (6, 7, 8, 9) and at least a protection container (10, 11, 12) which contains said batteries (6, 7, 8, 9), wherein said container (10, 11, 12) comprises:

at least a cooling plate (12) placed in contact with said batteries (6, 7, 8, 9) and having:

a plurality of through holes (13) which communicate directly with the ambient and which cross said cooling plate (12) in the direction of its width and/or its length, each of said holes (13) having an access on a first perimeter side (12*a*) of said cooling plate (12) and an exit on an opposite second perimeter side (12*b*) of said cooling plate (12); and two opposite transmission faces (17, 18) in contact with which are placed one or more batteries (6, 7, 8, 9), between said faces (17, 18) being obtained said through holes (13);

at least two cooling half-shells (10, 11), each containing at least one of said batteries (6, 7, 8, 9) and placed in contact with said batteries (6, 7, 8, 9), said half-shells (10, 11) being separated from said cooling plate (12) and joined to said cooling plate (12) in correspondence of said transmission faces (17, 18).

2. Unit (1) according to claim 1, wherein said cooling plate (12) supports said batteries (6, 7, 8, 9).

3. Unit (1) according to claim 2, wherein said cooling plate (12) has at least a bracket (14, 15) which supports at least one of said batteries (6, 7, 8, 9).

4. Unit (1) according to claim 1, wherein said holes (13) are rectilinear and parallel to each other.

5. Unit (1) according to claim 1, wherein said cooling plate (12) includes at least one cooling part (22, 23, 24) having said holes (13) and at least a structural part (25, 26, 27) with greater mechanical resistance than said cooling part (22, 23, 24).

6. Unit (1) according to claim 5, wherein:

said cooling plate (12) has at least a bracket (14, 15) which supports at least one of said batteries (6, 7, 8, 9); and said at least one bracket (14, 15) is associated with said at least one structural part (25, 26, 27).

7. Unit (1) according to claim 1, wherein said half-shells (10, 11) have at least a finned external surface (20, 21) for cooling.

8. Unit (1) according to claim 1, wherein said half-shells (10, 11) internally define one or more compartments in which a power supply and charge circuitry (34, 35, 40) for the batteries (6, 7, 8, 9) is fully contained.

9. Unit (1) according to claim 1, wherein said half-shells (10, 11) have respective opening edges (10*a*, 11*a*) and are associable with said cooling plate (12) with said opening edges (10*a*, 11*a*) arranged substantially in correspondence of the perimeter of said transmission faces (17, 18).

10. Electric motorbike (2) wherein said motorbike (2) comprises a supply unit (1) according to claim 1.

11. Motorbike (2) according to claim 10, wherein said unit (1) is mounted on said motorbike (2) oriented with said cooling plate (12) arranged vertically and said holes (13) arranged parallel to the longitudinal axis of said motorbike (2).

\* \* \* \* \*